Oct. 29, 1957     M. W. BRAINARD     2,811,658
FIELD CONSTRUCTION FOR ELECTRIC MACHINES
Filed July 1, 1954     2 Sheets-Sheet 1
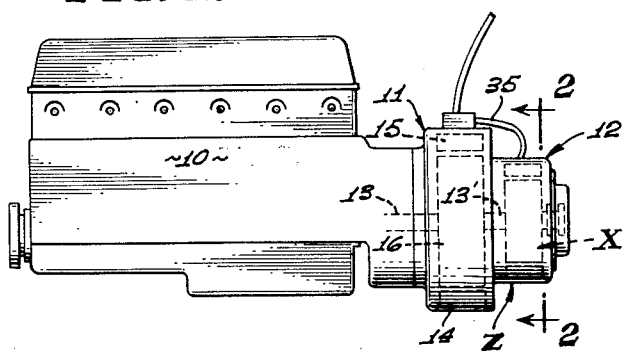
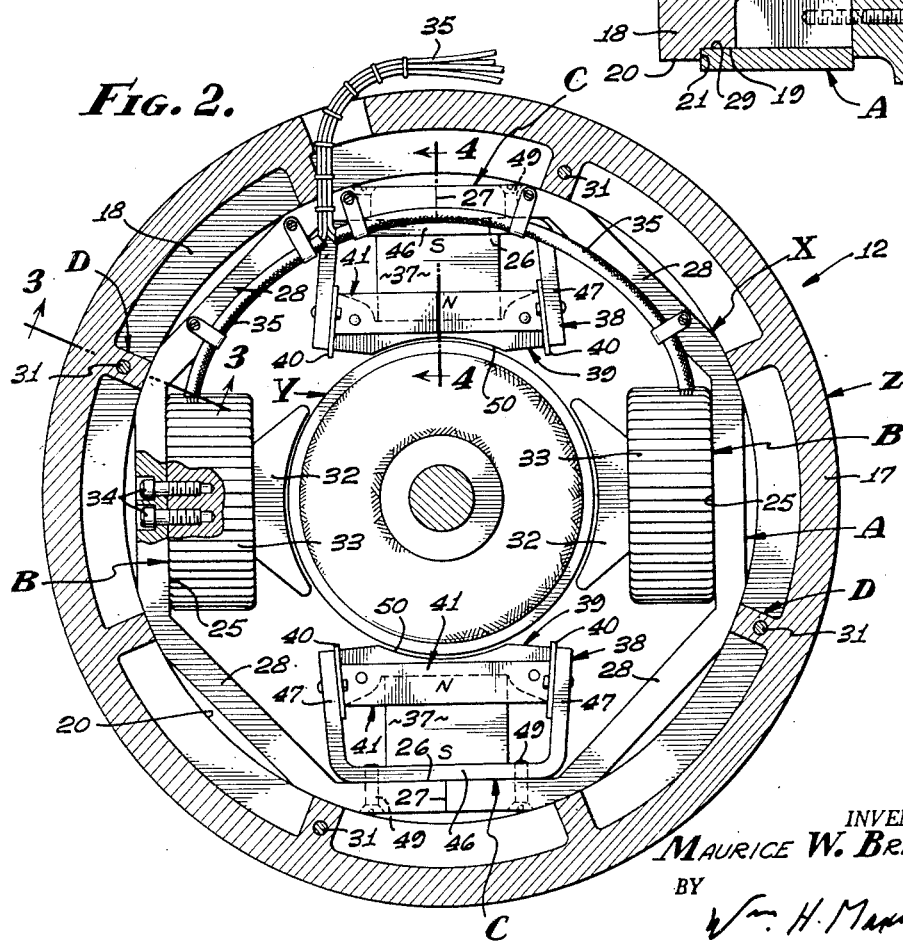
INVENTOR.
MAURICE W. BRAINARD
BY
Wm. H. Maxwell Jr.
AGENT.

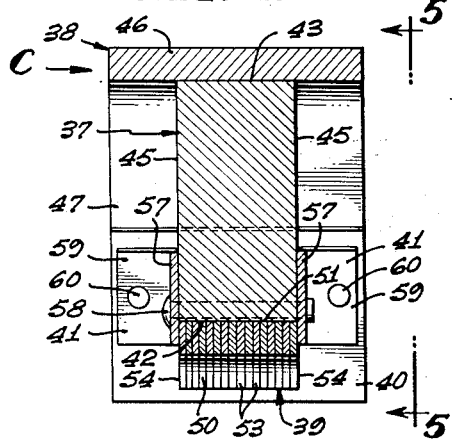
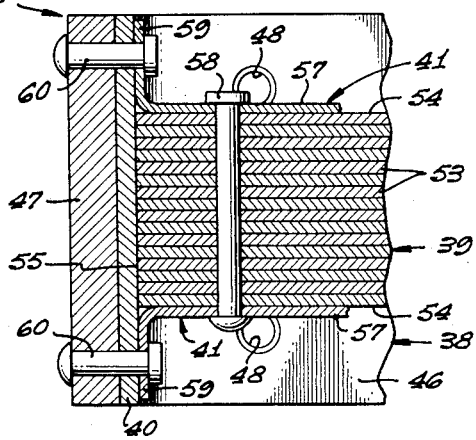
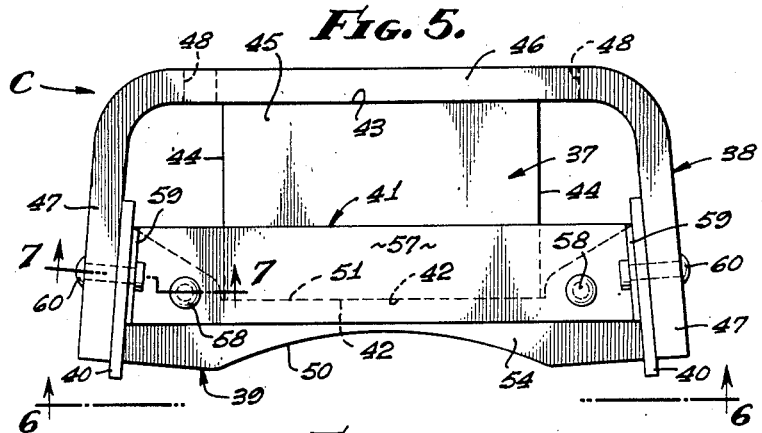
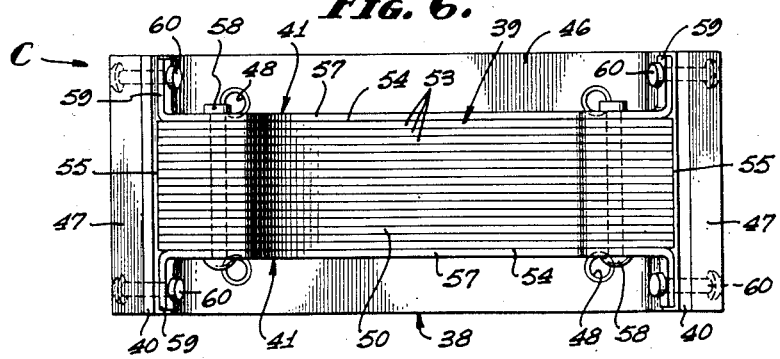

United States Patent Office 2,811,658
Patented Oct. 29, 1957

2,811,658

FIELD CONSTRUCTION FOR ELECTRIC MACHINES

Maurice W. Brainard, Montebello, Calif., assignor of one-half to O'Keefe & Merritt Company, Los Angeles, Calif., a corporation of California Application July 1, 1954, Serial No. 440,625

10 Claims. (Cl. 310—154)

This invention is concerned with the stator of an electric machine and is particularly concerned with field poles for such machines, it being a general object of the invention to provide a simple and practical pole piece or unit for a dynamo-electric machine, or the like.

The structure of the present invention is particularly applicable to electric generators and is particularly adapted to use in a field ring or stator which includes permanent magnet field poles. It is common in electric machines of the type under consideration to locate the field poles on an annular ring which surrounds the rotor of the machine. In such machines the field poles become damaged or weakened under certain operative conditions and it is, many times, necessary to replace them. It is, therefore, important to provide a field construction in which provision is made for replaceability of the field poles, and it is also highly important that a construction be provided in which the units to be replaced may be accurately formed and positioned within the field ring so that the rotor operates within the stator with proper clearance.

It is an object of the present invention to provide a simple, practical field structure of the character referred to composed of electromagnetically excited pole units and permanent magnet pole units. In the structure of the present invention there are both excited and permanent magnet units which are preferably spaced around the inside of the stator ring in an alternate series.

It is also an object of the present invention to provide a field structure with a replaceable permanent magnet unit. It will be apparent that there may be several field units in the machine involved which may be either excited field units or permanent magnet field units. The invention is particularly concerned with the permanent magnet field units which may be individually produced, magnetized, stored and installed in the machine in a most economical manner.

It is also an object of this invention to provide a permanent magnet field pole unit for an electric machine such as a generator or the like, which is simple, practical and easily manufactured.

It is still another object of this invention to provide a permanent magnet field pole unit for a machine of the character referred to which can be manufactured and charged with magnetic flux and which will not lose its magnetic charge. The field pole unit may be charged with suitable polarity as circumstances require. In the structure of the present invention a keeping means is provided which directs the flux through the permanent magnet so that the lines of magnetic force are related to the magnet in a manner to preserve the magnetism with which the magnet has been charged.

It is an object of this invention to provide a field or stator construction in which all like permanent magnet units are identical. By constructing the machine with an even number of field poles and by making every other pole a permanent magnet pole, I have provided a structure wherein all the permanent magnet poles are identical so that each one is charged in the same manner. That is, each permanent magnet pole may be charged as a north pole. It is to be understood that all the excited poles may be wound in the same manner so that they all become south poles or they may be connected to different circuits and have opposite polarity when current is applied to them.

The various objects and features of my invention will be fully understood from the following detailed description of a typical preferred form and application of my invention, throughout which description reference is made to the accompanying drawings, in which:

Fig. 1 is a view showing a generating set which incorporates the structure of the present invention. Fig. 2 is an enlarged detailed sectional view taken as indicated by line 2—2 on Fig. 1. Fig. 3 is a sectional view taken substantially as indicated by line 3—3 on Fig. 2. Fig. 4 is an enlarged detailed sectional view of one of the permanent magnet units taken as indicated by line 4—4 on Fig. 2. Fig. 5 is a side view of the unit shown in Fig. 4, being a view taken as indicated by line 5—5 on Fig. 4. Fig. 6 is a view of the unit shown in Fig. 5, being a view taken as indicated by line 6—6 on Fig. 5, and Fig. 7 is an enlarged detailed sectional view taken as indicated by line 7—7 on Fig. 5.

The structure of the present invention is to be used in connection with dynamo-electric machines and in the drawings I have shown it incorporated in an engine generator set. In Fig. 1 of the drawings I have illustrated the generator set as including, an engine or prime mover 10, a generator 11, and an exciter 12. The engine 10 may be an ordinary internal combustion engine, or the like, and the generator 11 is shown carried by the fly-wheel housing of the engine and is driven by the drive shaft 13 thereof. The generator 11 may include a casing 14 housing a stator 15, and a rotor 16 which is driven by the shaft 13 which projects from the engine 10. In the case illustrated, the stator 15 may be an armature, while the rotor 16 may be a field carried in a shaft 13'.

The exciter 12 is provided on the generator set to furnish power to excite the field 16 of the generator 11 and involves, a field structure X which incorporates the structure of the present invention and also involves a rotating armature Y. The field X and armature Y are carried in a suitable housing Z.

The housing Z is a simple cylindrical part and, in effect, may be an extension of the casing 14 of the generator 11 and involves, a wall 17 and an inner flange 18 with a recess 19. The wall 17, flange 18 and recess 19 are all circular parts which are concentric with the central axis of the structure. The flange 18 projects radially inward from the wall 17 and terminates at a bore 20 which is concentric with the central axis of the structure. The recess 19 is formed in the flange 18 by a counterbore that terminates at a bottom face 21 which is in a plane normal to the axis of the machine.

The field structure X that I have provided is an annular structure involving a plurality of field magnets or units, and as shown in the drawings involves, generally, a frame A, one or more coil excited pole units B, one or more permanent magnet pole units C and means D securing the field structure X in operating position within the housing Z. The pole units B and C are shown arranged alternately in a continuous series which extends circumferentially of the frame A.

The frame A is a continuous annular element formed of magnetic material such as iron and is provided to form a magnetic flux carrying core which magnetically joins the series of field pole units B and C. The frame A carries magnetic flux from one pole unit to the next, and is preferably a polygonal element having as many sides as there are pole units B and C, preferably twice as many sides.

As shown in the drawings, there are pole seats 25 provided at the inner periphery of the frame A for the pole units B, while there are pole seats 26 for the pole units. The frame A is substantially rectangular in cross sectional configuration and may be formed of a single elongate bar with the ends thereof butted together. It is preferred that the frame A be formed of two like parts, each forming one half of the frame, which are secured together at diametrically opposite points 27 and are permanently fastened together by means of welding or the like. The seats 25 and 26 are alike and each presents a flat surface which is in a plane normal to the axis of a pole unit, which axis extends radially from the central axis of the structure. The seats 25 and 26 are coextensive with the width of the units B and C which will be hereinafter described.

The portions of the frame A provided with the seats 25 and 26 are joined by tie portions 28 which may be straight portions, or sides, linking the frame A together into a continuous annular part. As illustrated, where there are only four pole units the portions 28 are of substantial length. However, it is to be understood that where there is a large number of pole units the portions 28 will be of minor proportion. The peripheral corners of the frame A are turned at 29 so that the frame is concentrically received in the recess 19 provided in the flange 18.

The means D for securing the stator field X in operating position involves the end bell housing 30 that closes the outer end of the frame A. Suitable bolts 31 are threaded into ribs that project from the flange 18 and act to clamp the bell housing 30 onto the frame to hold it in seated engagement on the flange 18 with the turned corners 29 centered in the recess 19 as shown in Fig. 3 of the drawings.

Each coil excited unit B is an electromagnet and involves a pole piece 32 and a field winding 33. In the preferred form of the invention and as shown, the units B are all alike and are secured in place on the seats 25 by means of suitable screw fasteners 34, or the like. It is a feature of the present invention that all of the windings 33 may be identical. That is, all the windings may be wound in the same manner so that the polarities of all the units B are the same. For example, coils 33 of units B may be wound in a manner to be south poles as indicated in the drawings. The coils 33 may be energized through suitable lead lines 35 taken from the out-put of the generator 11.

Each permanent magnet pole unit C is a magnetically charged unit and involves, generally, a magnet 37, a keeper 38 which carries and protects the magnet 37, a pole piece 39 which handles the magnetic flux stored in the magnet, spacers 40 provided between the pole piece and the keeper, and clamps 41 provided to secure the elements involved together. The elements above referred to are secured together by the clamps 41 to form a single unit which may be easily handled and installed in the machine.

The magnet 37 is a simple rectangular block of magnetic material having a flat top 42, a flat bottom 43, flat sides 44 and flat ends 45. The block may be formed of any suitable flux retaining material which is ordinarily used or employed in forming permanent magnets of the type under consideration. In the case illustrated, the magnets 37 are polarized so that the top 42 presents a north pole, while the bottom 43 presents a south pole. It is a feature of the present invention that all the units C may be identical. That is, all the magnets 37 are polarized in the same direction so that they are interchangeable with each other.

The keeper 38 which I have provided is a U-shaped part having a flat plate-like body 46 adapted to have flat seating engagement with a seat 26, and upstanding arms 47 which project from each side of the body. The keeper 38 is made from an elongate iron bar and is adapted to conduct the magnetic flux produced by the magnet 37. The magnet 37 is cradled or carried on the body 46 between the arms 47 which occur at the sides of the body so that the bottom 43 of the magnet has flat seating engagement with the plate-like body 46. As shown in Fig. 5 of the drawings, the arms 47 are slightly divergent as they extend away from the body 46 and are spaced a substantial distance from the sides 45 of the magnet 37. Suitably placed threaded openings 48 are provided in the body 46 and are adapted to receive screw fasteners 49 that project from the frame A.

The pole piece 39 has an arcuate face 50 that is curved more or less concentrically with the central axis of the rotor Y, and a flat face 51 which is adapted to have flat seating engagement with the top 42 of the magnet 37. The pole piece 39 may be and is shown as a laminated structure involving a plurality of like pole piece laminations 53 formed of magnetic material, preferably of suitable sheet iron. The laminations of each pole piece are parallel with each other and extend circumferentially of the axis of the structure in a plane normal to the axis thereof, and they are arranged side by side to bear one against the other in a compact assembly. As illustrated, the stack of laminations of the pole piece 39 has a recess for receiving the top of the magnet 37, has flat end faces 54 and flat sides 55 which terminate at a point spaced from the arms 47 of the keeper 48. The recess in the pole piece 39 forms the face 51 that receives the top of the magnet. The sides 55 are parallel to the arms 47 and, therefore, are somewhat divergent in the same manner as the arms 47.

The spacers 40 are provided to maintain the proper gap between the arms 47 and the sides 55 of the pole piece 39. The spacers may be simple elements of sheet metal such as aluminum or brass, or any other non-magnetic material. In carrying out the present invention it is necessary to insure proper spacing between the sides 55 of the pole piece 39 and the arms 47, which spacing may be an air gap. However, it is preferred to provide the spacers 40 of non-magnetic material so that the parts are related in a positive predetermined manner.

The clamps 41 are provided to join the parts 37, 38, 39 and 40 above described into a single unitary structure. As shown in Fig. 6 of the drawings, two clamps 41 are provided and each involves a simple elongate bar of any suitable material with a straight center portion 57 that is coextensive with the end of the pole piece 39 and extends from one arm 47 to the other. Each clamp projects downwardly from the outer face 51 of the pole piece 39 to overlie the ends 45 of the magnet 37. Suitable fasteners such as rivets 58, or the like, extend through the laminations of the pole piece 39 and clamps 41 to hold the laminations of the pole piece together in tight clamped engagement. A foot 59 is provided at each end of the clamp 41 and carries a fastener 60, preferably a rivet or the like, which extends through the spacers 40 and arms 47 of the keeper 38. The fasteners 60 are of non-magnetic material so that the arms 47 are magnetically insulated from the sides 55 of the pole pieces.

From the foregoing it will be readily understood that I have provided a pole piece construction characterized by permanent magnets which is easy to make and practical for installation in an electric machine. By the arrangement of parts that I have provided all like pole pieces may be identical, that is, all of the coil excited pole pieces may be identical and all of the permanent magnet pole pieces may be identical. By so doing, it is merely necessary to stock but one kind of manufactured article in connection with each one of the pole pieces which I have provided.

By constructing a permanent magnet pole piece, as above described, the magnetic flux, stored in the permanent magnet, is conducted from the top to the bottom of the magnet by means of the arms 47 which are provided on the keeper 38. When the permanent magnet field is installed in the electric machine the clearance between the rotor Y and stator X is less than the clearance between the arms 47 and sides 55 of the pole pieces 39, and therefore a large proportion of the magnetic flux of th magnets 37 will pass through the iron in the rotor Y and only a very small proportion will pass through the arms 47.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A field structure of the character described including, a continuous annular ring having a circumferentially spaced series of flat inwardly faced seats, and a series of alternately arranged units carried on the seats, there being coil excited field pole units each including a field pole and coil, and permanent magnet field pole units each including a permanent magnet carried by a magnetic flux keeper having arms projecting therefrom substantially parallel with the side of the magnet, a laminated pole piece at the pole of the magnet and extending between the arms of the keeper, spacers between the arms and the sides of the pole piece, and clamps at the ends of the pole piece securing the laminations together and having feet fastened to the arms through the spacers.

2. A field structure unit of the character described including, a magnetic flux keeper having a center body portion and arms projecting from the sides of the body, a permanent magnet carried on the body between the arms, and a pole piece at the pole of the magnet and extending between the arms of the keeper and spaced therefrom and carrying magnetic flux to the keeper.

3. A field structure unit of the character described including, a magnetic flux keeper having a center body portion and arms projecting from the sides of the body, a permanent magnet carried on the body between the arms, a pole piece at the pole of the magnet and extending between the arms of the keeper and spaced therefrom and carrying magnetic flux to the keeper, and spacers between the arms and the sides of the pole piece.

4. A field structure unit of the character described including, a magnetic flux keeper having a center body portion and arms projecting from the sides of the body, a permanent magnet carried on the body between the arms, a pole piece at the pole of the magnet and extending between the arms of the keeper and spaced therefrom and carrying magnetic flux to the keeper, spacers between the arms and the sides of the pole piece, and clamps secured to the pole piece and having feet fastened to the arms through the spacers.

5. A field structure unit of the character described including, an elongate magnetic flux keeper having a center body portion and arms projecting from the sides of the body, a block shaped permanent magnet carried on the body between the arms and having one pole engaged with said body, and a pole piece at the other pole of the magnet and extending between the arms of the keeper and spaced therefrom, the pole piece and keeper being adapted to carry magnetic flux between the poles of the magnet.

6. A field structure unit of the character described including, an elongate magnetic flux keeper having a center body portion and arms projecting from the sides of the body, a block shaped permanent magnet carried on the body between the arms and having one pole engaged with said body, a laminated pole piece at the other pole of the magnet and extending between the arms of the keeper and spaced therefrom, the pole piece and keeper being adapted to carry magnetic flux between the poles of the magnet, spacers between the arms and the sides of the pole piece, and clamps at the ends of the pole piece securing the laminations together and having feet fastened to the arms through the spacers.

7. A field structure of the character described including, a continuous annular ring having a circumferentially spaced series of inwardly faced seats, and a permanent magnet field pole unit carried on one of the seats and including, a permanent magnet carried by a magnetic flux keeper having arms projecting therefrom at the sides of the magnet and a pole piece at the pole of the magnet and extending between the arms of the keeper.

8. A field structure of the character described including, a continuous annular ring having a circumferentially spaced series of inwardly faced seats, and a series of permanent magnet field pole units carried on the seats and each including, a permanent magnet carried by a magnetic flux keeper having arms projecting therefrom at the sides of the magnet and a pole piece at the pole of the magnet and extending between the arms of the keeper.

9. A field structure of the character described including, a continuous annular ring having a circumferentially spaced series of inwardly faced seats, and a series of permanent magnet field pole units carried on the seats and each including, a permanent magnet carried by a magnetic flux keeper having arms projecting therefrom at the sides of the magnet, a pole piece at the pole of the magnet and extending between the arms of the keeper, spacers between the arms and the sides of the pole piece, and clamps at the ends of the pole piece and having feet fastened to the arms through the spacers.

10. A field structure of the character described including, a continuous annular ring having a circumferentially spaced series of inwardly faced seats, and a series of permanent magnet field pole units carried on the seats, and each including, a permanent magnet carried by a magnetic flux keeper having arms projecting therefrom at the sides of the magnet, a laminated pole piece at the pole of the magnet and extending between the arms of the keeper, spacers between the arms and the sides of the pole piece, and clamps at the ends of the pole piece securing the laminations together and having feet fastened to the arms through the spacers.

References Cited in the file of this patent

UNITED STATES PATENTS

| 1,247,650 | Doman | Nov. 27, 1917 |
| 2,128,044 | Grabner | Aug. 23, 1938 |
| 2,193,406 | Goss et al. | Mar. 12, 1940 |
| 2,398,653 | Linlor | Apr. 16, 1946 |
| 2,482,875 | Sawyer | Sept. 27, 1949 |